United States Patent [19]
Otsuki et al.

[11] 3,914,290
[45] Oct. 21, 1975

[54] PROCESS FOR ESTERIFYING ACRYLIC ACID

[75] Inventors: Susumu Otsuki; Isao Miyanohara, both of Yamaguchi, Japan

[73] Assignee: Rohm and Haas Company, Philadelphia, Pa.

[22] Filed: May 7, 1969

[21] Appl. No.: 822,461

[30] Foreign Application Priority Data
Feb. 6, 1969 Japan.................................. 44-8444

[52] U.S. Cl............................................... 260/486 R
[51] Int. Cl.².......................................... C07C 09/54
[58] Field of Search..................................... 260/486

[56] References Cited
FOREIGN PATENTS OR APPLICATIONS
627,490   1/1963   Belgium............................. 260/486

Primary Examiner—Anton H. Sutto
Assistant Examiner—P. Killos
Attorney, Agent, or Firm—Flynn & Frishauf

[57] ABSTRACT

A continuous process for producing an acrylate which comprises reacting acrylic acid with methanol or ethanol using the reactive-distillation method wherein acrylic acid is fed into the upper section of a distillation column and an alcohol is fed into the lower section. The reactive-distillation is carried out by maintaining a reflux ratio at 1 or less thereby distilling out the ester produced with almost all of the water added and produced through the reaction of esterification from the top of the column and high boiling point materials by-produced are discharged from the bottom of said column in a state substantially free from unreacted acrylic acid.

8 Claims, 1 Drawing Figure

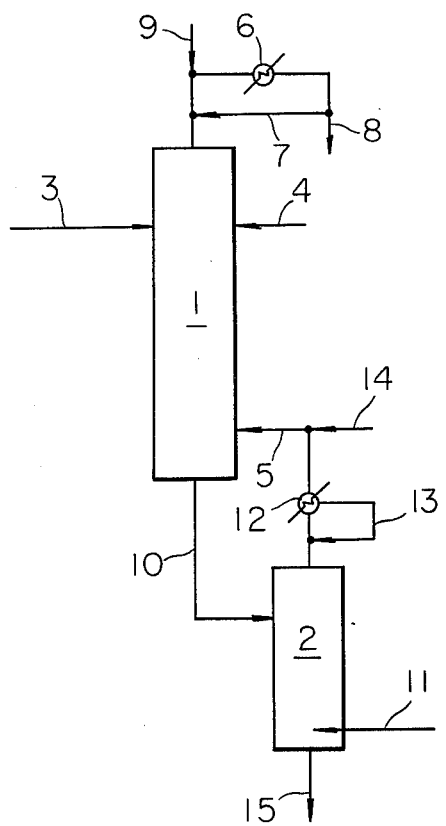

PROCESS FOR ESTERIFYING ACRYLIC ACID

BACKGROUND OF THE INVENTION

1. Field of the invention

The present invention relates to a process for producing methyl acrylate or ethyl acrylate by esterifying acrylic acid with methyl or ethyl alcohol in a particular reaction system. The characteristic feature is that the reaction carried out continuously and is completed in a once through reaction without recycling of the reactants and, further, the reaction time is very short and the apparatus is compact and, furthermore, materials having high boiling points and the catalyst can be continuously separated and removed from the reaction mixture.

2. Description of the Prior Art

It is well known that an acrylic monomer has an unsaturated bond and is easily subjected to polymerization and dimerization by heating. Further, it is also known that, in the case of using strong acid as a catalyst, its dimerization is accelerated and, as the concentration of material having a high boiling point is increased, the rate of by product production is increased. Therefore, under these conditions the reaction does not progress smoothly and the yield of the reaction is decreased. Consequently, in carrying out the reaction for esterifying acrylic acid, special attention must be paid to these factors.

Many experiments have been carried out in the past in an attempt to eliminate these disadvantages. For example, experiments have been carried out at low temperature, the heating time of the acrylic monomer has been shortened, the reaction has been carried out in gaseous phase or a special catalyst has been used. The present inventors carried out research on various processes as noted above. They discovered that when the process was carried out at low temperature there was the disadvantage of slowing the reaction velocity; when the process was carried out in gaseous phase the probability of polymerization or dimerization was a decreased but there was a disadvantage in view of equilibrium and low reaction rate. When the reaction was carried out employing a catalyst other than strong acid, e.g. a process of using ion exchange resin, the reaction rate was lowered and the life of the catalyst was shortened.

Summary of the Invention

Therefore, the inventors carried out research, concentrating their effort on shortening the heating time of the acrylic monomer and they have invented a novel process for preparing an acrylate. In the process, the reaction of acrylic acid and an alcohol proceeds rapidly, and accordingly, the residence time of acrylic acid can be minimized. Further, in the process, high boiling material can be removed easily and continuously without heating the acrylic acid. Said process comprises employing a distillation column as a reactor, feeding acrylic acid into the upper section of said column and feeding said alcohol into a lower section of said column and performing reaction and distillation continuously and simultaneously by maintaining a reflux ratio at 1 or less thereby distilling off the ester produced, a major part of the water fed in said column and water produced from the esterification reaction from the top of said column, and further discharging materials having high boiling points from said bottom in a form substantially free from acrylic acid.

The present invention is explained in more detail hereunder with reference to the drawing.

The attached drawing illustrates a simplified flow diagram of one embodiment for carrying out the present invention.

Acrylic acid and a catalyst, i.e. sulfuric acid, are fed by means of a conduit 3 and another conduit 4 into upper parts of perforated plate type reaction-distillation column 1, of 5–25 theoretical plates. Vapor of methyl alcohol or ethyl alcohol (hereinafter these are called alcohol) is fed into the bottom of said column by means of conduit 5 and acrylic acid is made to contact countercurrently and react with the alcohol in reaction column 1. The reaction products, i.e. are acrylate and water, and surplus alcohol are taken out of the top of the column and said compounds are condensed in a cooler 6 and one part thereof is refluxed to the column top by means of conduit 7 and other part is taken out from the reaction system through conduit 8.

For the sake of inhibiting polymerization inside of said column, a polymerization inhibitor is fed from the column top by means of conduit 9 and, if said inhibitor is a solid, it is first dissolved in alcohol, then fed as a solution.

Sulfuric acid, material having a high boiling point, alcohol and water are taken out from the bottom of the column, by means of conduit 10. The materials are fed into the upper part of a distillation column 2 having 5–15 theoretical plates and steam is blown into the bottom of the column 2 by means of conduit 11, and thereby alcohol is stripped-off. One part of the alcohol vapor thus stripped is condensed with partial condenser 12 and is refluxed to the column 2 sy means of conduit 13 ]nd another part of the alcohol vapor is directly fed into the reaction column 1 by means of conduit 5. An auxiliary amount of alcohol is similarly fed into reaction column 1 through conduit 14 and conduit 5. Sulfuric acid, materials having high boiling point and water are taken out from the bottom of the distillation column 2 through line 15.

It is not necessary for the alcohol to be fed into the reaction column 1 in vapor state and when a vapor generator is provided at the bottom of the reaction column 1, alcohol in liquid form can be fed. Further, the amount of alcohol charged is in the range of 3 to 6 moles per one mole of acrylic acid charged.

Sulfuric acid is fed into the column 1 in the proportion of 2 to 5 weight percent of the liquid composition in the feed tray of the reactiondistillation column and the reflux ratio is selected as 1 or less, preferably being kept as 0.5 or less; the acrylic acid concentration in the feed tray must be maintained at 20 percent or more.

The reaction-distillation column 1 under the above conditions shows a temperature distribution far from that normally presumed for a distillation column. In other words, a high temperature is maintained in the upper part and a lower temperature is kept in the lower part of the column 1. This special temperature distribution is a result of the following factors: (a) alcohol is fed into the lower part of the column 1, (b) acrylic acid is charged into the upper part of the column 1, (c) reaction heat is generated in the column and (d) an extraordinarily small reflux ratio is maintained. The ester product is rectified and distilled out from the top of the column 1 and acrylic acid flows down through the column in liquid state. Further, water in a quantity far exceeding an amount of azeotropic composition is distilled out from the column top. This phenomenon is difficult to understand by the common concept of distillation. It was well known that esterification is hindered by the presence of water. Since a large amount of water is distilled out from the top, and therefore, at the lower part of the column, concentration of water is not high. Accordingly, a reaction of acrylic acid with an alcohol is advantageously conducted in the lower part of the column 1.

Moreover, alcohol constitutes the major part of the liquid composition in the lower part of the column 1 and as a result, esterification is easier to complete.

According to the process of this invention as above mentioned, the residence time of acrylic acid for obtaining acrylic acid conversion of 99 percent or more is about 70 minutes and the yield of acrylic ester exceeds 96 percent. Further, the acrylic acid charged thereto need not necessarily be dry, but acrylic acid having a purity of 60 percent or less is not advantageous from the viewpoint of utility consumption. This reaction time is exceedingly short compared with that of a batch process or a continuous process using a tank reactor, and, further, recovery of acrylic acid from the materials having a high boiling point is not necessary.

Several processes which use a distillation column for performing this esterifying reaction are known, and such conventional processes are similar to the process of this invention in the point that methyl ester or ethyl ester is distilled off from the column top, but they differ from the process of this invention in the point that in the conventional processes, water is withdrawn from the bottom of the column, contrary to this, in the present process water is distilled out from the top. At the lower part of the column, the concentration of acrylic acid is low and additionally, the water content is high and thereby, in such conventional processes the reaction rate is very low at the lower part of the column. The reaction time of this invention is remarkably fast compared to the conventional processes. In other words, one feature of the present invention is to provide a process which comprises maintaining a reflux ratio of 1 or less, preferably at 0.5 or less, and further keeping the concentration of acrylic acid above 20 percent in the acid feed tray and thereby showing a characteristic temperature profile through the column and consequently, distilling off a major part of the water introduced and produced from the column top and reducing the water content at the lower part of the column and thereby enhancing greatly the reaction rate. The term "percent" used hereinafter means weight percent unless otherwise specified.

EXAMPLE I

A distillation column 50 mm in diameter with 15 perforated plates equipped with a 2 l kettle was employed; acrylic acid in liquid form was fed in from the second tray from the top, and sulfuric acid and methanol were fed in from the fourth and 15th trays from the top respectively; said feeds were passed through respective preheaters and thereby the reaction was carried out. From the top of the column, a polymerization inhibitor, i.e. a methanol solution containing hydroquinone was fed and its concentration was maintained at 0.1 weight percent in proportion to the total liquid, thereby polymerization was inhibited. A 98 percent concentration of acrylic acid was fed at the rate of 190 g/hr; sulfuric acid was fed at a rate to maintain a 3.7 percent concentration in the feed tray and methanol was fed at the rate of 360 g/hr. Said components were fed simultaneously into said column. The reflux ratio was kept at 0.54 and the temperatures in the fourth tray, kettle and top end of the column were respectively 83°C, 68°C, and 67°C, and 80 percent or more of water produced from the reaction was distilled off. The average residence time of acrylic acid under the above conditions was 35 minutes and the conversion of acrylic acid in 5 hours of operation under the above condition was 81 percent.

EXAMPLE II

The apparatus and procedures employed were entirely the same as in Example I, except that the reflux ratio was changed to 1.0. The residence time of acrylic acid was 22 minutes, and the temperatures were respectively 65°C at the top end of the column, 79°C in the fourth tray and 76°C at the inside of the kettle. 40 percent of produced water was distilled off. A conversion of acrylic acid in 5 hours of operation under the above conditions was 50 percent.

EXAMPLE III

The same apparatus as in Example I was employed, but ethyl alcohol was used in the reaction instead of methyl alcohol.

98 percent acrylic acid was fed at the rate of 175 g/hr, ethanol at 340 g/hr and sulfuric acid at a feed rate maintaining 3.0 percent concentration in the fourth tray, i.e. feed tray. Said components were continuously and simultaneously fed into the apparatus. The reflux ratio was set at 0.68 and the average residence time of acrylic acid was 30 minutes; the measured temperatures were 80.5°C at the top end of the column, 93.7°C in the fourth tray and 82.5°C inside of the kettle. Further, the concentration of acrylic acid in the second tray was 45 percent.

The conversion of acrylic acid in 5 hours of continuous operation under the above conditions was 83 percent.

EXAMPLE IV

A column 50 mm in diameter with 7 perforated plates and equipped with a 5 l kettle was employed (hereinafter, this setup called "methanol column"). Methanol vapor was taken out of the top of the methanol column and fed into the 15th tray from the top of the esterification column at a feed rate of 15 mol/hr and further acrylic acid was fed into the 2nd tray of the esterification column at a feed rate of 175 g/hr. Furthermore, sulfuric acid was fed into the 4th tray so as to maintain a concentration of 4.1 percent in the 4th tray i.e. feed tray.

Then, liquid, which was discharged from the bottom of the esterification column was fed into the 2nd tray of the methanol column from the top and steam was blown into the kettle of the methanol column. The reflux ratio in the esterification column was 0.24 and the concentration of acrylic acid in the 2nd tray was 55 percent; the residence time of acrylic acid was 40 minutes. Temperatures in the 5 tray and the 15th tray were 84°C and 67°C respectively.

The conversion of acrylic acid in 3 hours of operation under the above conditions was 90 percent.

EXAMPLE V

The same apparatus as in Example I was employed and 20 percent aqueous solution of acrylic acid was fed at the rate of 190 g/hr and methanol was fed at the rate of 280 g/hr into the 2nd and 15th trays from top of the column respectively.

Further, sulfuric acid was charged into the 4th tray, so as to give a sulfuric acid concentration of 6.3 percent in the feed tray. The reflux ratio and the residence time were respectively 0.32 and 37 minutes. The temperatures at the top end of the column, the second tray and the inside of the kettle were respectively 78°C, 82°C and 70°C. The conversion of acrylic acid in 5 hours of operation under the above conditions was 60 percent.

EXAMPLE VI

A distillation column 50 mm in diameter with 25 perforated plates and equipped with a 2 l kettle was employed and acrylic acid (concentration: 98 percent) was fed at the rate of 210 g/hr and methanol at the rate of 430 g/hr into the 3rd tray from the top end, and the 22nd tray respectively. Sulfuric acid was charged into the 5th tray, so as to give a sulfuric acid concentration of 3.9 percent in said feed tray. The reflux ratio and the residence time of acrylic acid were respectively selected as 0.15 and 74 minutes. The temperature distribution showed 70°C at the top end of the column, 85°C in the fourth tray, 71°C in the 15th tray, 68°C in the 22nd tray and 77°C inside of the kettle. Further, a distillate was obtained at the rate of 580 g/hr at the top of the column; it contained 64 molar percent of methanol and 20 molar percent of methyl acrylate and 16 molar percent of water.

The distilled water was equal to 91 percent of water produced through the esterification reaction. The conversion of acrylic acid in 50 hours of operation under the above stationary conditions was 99 percent or more. Further, the selectivity showed 97 percent at minimum.

EXAMPLE VII

The same apparatus as in Example VI was employed and thereby esterification with ethyl alcohol was carried out.

Acrylic acid (concentration: 98 percent) was fed at the rate of 160 g/hr and ethanol at the rate of 380 g/hr and sulfuric acid at a rate giving a 3.9 percent concentration in the feed tray, said components were respectively charged into said apparatus. The acrylic acid concentration was 55 percent in the fourth tray. The reflux ratio was 0.29 and the resident time of acrylic acid was 72 minutes. The temperature distribution was 77°C at the top end of the column, 93°C in the fourth tray, 81°C in the 15th tray, 80°C in the 22nd tray and 87°C inside of the kettle. Further, a distilled material was obtained from the top end of the column at a rate of 485 g/hr and its composition was 60 molar percent of ethanol, 22 molar percent of ethyl acrylate and 18 molar percent of water. The distilled water was equal to 95 percent of water produced through esterification reaction. The conversion in 50 hours of operation under the above conditions was 99 percent, minimum: further, the selectivity was 96 percent, minimum.

What we claim is:

1. In a process for producing an ester from acrylic acid and an aliphatic alcohol in the presence of a catalyst comprising sulfuric acid in a distillation column serving as a reactor, wherein acrylic acid is fed to a feed tray therein in an upper section of said column and methyl or ethyl alcohol is fed into a lower section of said column, said catalyst is fed into an upper section of said column, wherein continuous reaction and distillation are performed simultaneously in said column, and wherein said ester is distilled from said column, the improvement which comprises maintaining a concentration of at least 20 percent of acrylic acid in the combined weights of the acrylic acid and sulfuric acid so fed, so feeding acrylic acid having a concentration of more than 60 percent, and maintaining a reflux ratio of up to 1 in said column.

2. The process of claim 1, wherein an upper part of said column is maintained at a higher temperature than the temperature at a lower part of said column.

3. The process of claim 1 wherein 3–6 moles of alcohol are charged per one mole of acrylic acid.

4. The process of claim 1, wherein the concentration of sulfuric acid in the sulfuric acid feed tray is kept within a range of from 2–5% by weight.

5. The process of claim 1, wherein a polymerization inhibitor is added to the column from the top thereof.

6. The process of claim 1, wherein the alcohol is methyl alcohol.

7. The process of claim 1, wherein the alcohol is ethyl alcohol.

8. The process of claim 1, wherein the reflux ratio is less than 0.5.

* * * * *

UNITED STATES PATENT OFFICE
CERTIFICATE OF CORRECTION

PATENT NO. : 3,914,290
DATED : October 21, 1975
INVENTOR(S) : S. Otsuki, I. Miyanohara It is certified that error appears in the above-identified patent and that said Letters Patent are hereby corrected as shown below:

Column 2, line 16 "are" should be --an--.

Column 2, line 36 "]nd" should be --and--.

Signed and Sealed this twenty-third Day of March 1976

[SEAL]

Attest:

RUTH C. MASON
Attesting Officer

C. MARSHALL DANN
Commissioner of Patents and Trademarks